Patented July 31, 1934

1,968,468

UNITED STATES PATENT OFFICE 1,968,468

MERCERIZATION AND PURIFICATION OF CELLULOSE FIBER

Milton O. Schur and Benjamin G. Hoos, Berlin, N. H., assignors to Brown Company, Berlin, N. H., a corporation of Maine No Drawing. Application July 3, 1930, Serial No. 465,786

18 Claims. (Cl. 260—10)

For some purposes, it is desirable that cellulose fiber be in a mercerized and purified state. Fiber in such state is, for instance, particularly advantageous for use as a raw material for making derivatives such as the nitrocelluloses. It is also valuable as a filler in papers and in other articles of manufacture because of its bulkiness, stability, and other characteristics.

In accordance with the present invention, we use solutions which mercerize cellulose fiber at one range of temperature conditions and purify it at another range of temperature conditions so that by subjecting the fiber to the action of the solution first at one of these two ranges of temperature conditions and then altering the temperature of the solution to the other range of temperature conditions, it is possible to accomplish both mercerization and purification of the fiber with the same solution. More specifically in accordance with our invention, mercerization and purification of cellulose fiber are accomplished in a single bath of caustic solution of a strength materially below about 18%, which is the caustic soda concentration necessary for mercerizing at about room temperature. Our invention comprehends the use of solutions of as low as 7% caustic soda concentration, or even lower, in bringing about both these results.

We have discovered that such double service of a single bath of caustic soda solution of materially below about 18% strength may be realized if the fiber is maintained in contact with the solution at sufficiently below room temperature to effect mercerization and at above or about room temperature, for the solution is effective in reacting upon and dissolving non-alpha cellulose components from the fiber at, or above, room temperature, so that by permitting a sufficient period of contact at such temperature between the fiber and the solution, we may bring about a pronounced purification of the fiber. By cooling the same solution sufficiently below room temperature, the fiber may be mercerized therewith, but the mercerizing temperature of the solution may be one at which the solution is insufficiently active so far as concerns reacting upon and dissolving non-cellulosic components and beta and gamma cellulose from the fiber. By the simple expedient of changing the temperature of the solutions in which the fiber is being treated, we may thus realize both a mercerization and purification of the fiber and at the same time dispense with the equipment and handling which would be necessary were the fiber mercerized and purified with different solutions. Again, the use of solutions of much lower than 18% strength makes possible a very significant saving, since the use of strong mercerizing solutions is accompanied by much loss of chemical by reason of the difficulty of washing the fiber completely free of chemical as well as the difficulty of recovering the chemical for reuse, unless countercurrent washing apparatus is employed.

While our invention is inclusive of practising the purifying step before the mercerizing step, from considerations of power consumption, we prefer to start with the solution sufficiently cold to mercerize, and after mercerization to raise the temperature of the solution sufficiently to purify.

We prefer to mercerize and then to purify for the further reason that mercerization under the temperature conditions which we employ is not accompanied by a noteworthy consumption of chemical by reaction, whereas purification of the fiber may be. In other words, we prefer to mercerize with a solution in which as little as possible chemical is present in spent condition so that not only will practically all the chemical be able to mercerize, but further so that mercerization may be effected at as high a temperature as possible with the particular strength of solution which is employed.

Cellulose fibers having various characteristics and of diverse origins may be processed in accordance with our invention, including wood pulps, such as sulphite or kraft, or cotton linters. The fiber may be treated as waterleaf paper, as comparatively thick sheets or boards, in bulk, or in any other suitable form. A raw wood pulp may be treated in bulk particularly if it is to receive refining treatments in addition to the mercerization and purification of the present invention. In making nitrocelluloses, however, it is sometimes preferred to nitrate wood pulp as comparatively thick sheets or boards, known in the trade as "drier sheets". In such case, all the treatments may be performed on the boards of pulp, but it is preferable to practice the treatment preceding the mercerization and purification of the present invention on the bulk pulp, and to form the pulp into sheets for such mercerization and purification, owing to the difficulty of producing satisfactory sheets of mercerized pulp. If the fiber is comparatively pure to begin with, as in the case of a refined, white, wood pulp or cotton linters, it need receive only the mercerizing and purifying treatment and a thorough washing to be in condition for conversion into nitrocelluloses of the best variety. A small amount of oxidizing agent, such as hypochlorite bleach, may be added to the caustic soda solution, and, if desired, the mercerized and purified fiber may be subjected to light bleaching to ensure the removal of the last traces of coloring matter.

Inasmuch as raw kraft pulp represents one of the most difficult fibers to condition for conversion into cellulose derivatives, we shall cite as a specific example how our mercerization and purification may be applied in the processing of such pulp to produce a cellulose which is convertible into nitrocelluloses of a quality comparing favorably with those obtained from high grade cotton linters. Before being mercerized and purified, a typical raw kraft stock of an alpha-cellulose content of, say, 89% is preferably brought to a light color with little degradation and loss of material by a two-step bleaching operation including an initial chlorine water treatment and a treatment with hypochlorite bleach liquor. Specifically, the stock is treated for ½ to 1 hour at room temperature as a 5% fiber suspension in chlorine water containing 7% chlorine, based on stock. The stock, preferably after being washed, is then treated at 10% stock density for 5 hours at 90° F. with a bleach liquor containing 6% hypochlorite bleach, based on stock. Preferably about 1% caustic soda, based on stock, is present in the bleach liquor so as to maintain a condition of alkalinity throughout the bleaching operation and thereby to inhibit the formation of oxycelluloses. The bleached pulp is then washed free of bleach liquor and reaction products.

The bleached pulp is then steeped in a caustic soda solution of a strength much lower than 18% but at sufficiently low temperature to be mercerizing. When such a treatment is being carried out in a kraft mill, the "white liquor" available in such a mill may be used to economic advantage, as the production of the raw kraft pulp and its subsequent mercerization and purification may be centered about a common liquor and no chemicals or recovery operations other than those in current use in the mill need be resorted to. By "white liquor" we mean, of course, the solution of caustic soda and sodium sulphide which is produced by smelting in a reducing atmosphere the inorganic content of spent kraft cooking liquor, dissolving the smelt in water, and treating the smelt solution with lime to causticize the sodium carbonate. For instance, the bleached pulp may be suspended at 10% consistency in a white liquor containing 7¾% alkali calculated as Na₂O, of which alkali 40% may be in the form of sodium sulphide and practically all the rest in the form of caustic soda. The liquor is at sufficiently low temperature to be mercerizing, for instance below, say, 6° C., at which temperature the stock suspension may be maintained for 15 minutes more or less to ensure mercerization. Heat is then applied to the mercerized stock to raise its temperature far beyond that at which the liquor is mercerizing, say, to room temperature (20° C.) or higher. The stock is maintained at this temperature for about 4 hours, at the end of which time it has undergone a pronounced purification as attested by an alpha-cellulose content of 94% or higher. The mercerized and purified stock is then washed, preferably with hot water, to remove as much alkali as possible as well as to secure the additional purification incident to the contact of the stock with hot dilute alkaline liquor during the washing operation. The washed stock may be further processed, for example, being bleached in a liquor containing 1% hypochlorite bleach and ½% caustic soda, based on stock, again washed, then treated with an antichlor such as a bisulphite solution of ¼% strength, and finally washed.

In the example hereinbefore given, the stock, rather than being processed in bulk, may be processed throughout in the form of drier sheets. It is preferable, however, from an economic standpoint to handle bulk pulp whenever possible so that even when the mercerized and purified pulp is to be converted into nitrocelluloses in the form of drier sheets, the pulp is handled in bulk up to the point where it is to be mercerized. It is then formed into drier sheets and the sheets are submerged in the caustic soda solution which is first at mercerizing temperatures and then at purifying temperatures, or vice versa. By so doing, we avoid the difficulty incident to making uniform sheets of mercerized fiber, which is exceedingly free and curly and tends to gather into clumps. Also sheets of unmercerized pulp are much stronger and more tenacious than sheets of pulp mercerized in bulk. Again, the mercerization of drier sheets toughens them so that their integrity or capacity for holding together during nitration is greatly enhanced, particularly if the mercerized sheets are steeped in hot water as opposed to cold water after the mercerizing and purifying solution has been drained off.

While we have hereinbefore spoken of the use of solutions of caustic soda as the mercerizing and purifying reagent, the term "caustic soda" is meant to include chemicals such as caustic potash, lithium hydroxide and mixtures of caustic with sodium sulphide which are more or less equivalent to caustic soda so far as appertains to their mercerizing and purifying action on cellulose fiber. For instance, in the specific example hereinbefore given, the sodium sulphide present in the white liquor assists the caustic soda in purifying the fiber at or above room temperature, and also aids the caustic soda in mercerizing the fiber below room temperature. In fact, were the sodium sulphide absent from the liquor and not replaced by caustic soda, its absence would be reflected in a diminished purifying and mercerizing effect on the fiber. In lieu of using a white liquor, as in the example given, an all-caustic soda solution of, say, 10% strength may be used, in which case, too, such a solution can mercerize the fiber only at considerably below room temperature, for instance at about 6° C. or lower. Such an all-caustic soda solution is available as the white liquor in a mill producing soda pulp and as such may be used to advantage in the mercerization and purification of such pulp.

In some cases, it may be desirable to remove excess mercerizing liquor from the stock after mercerization, as by passing it over thickeners which concentrate it from, say, about 10% stock consistency to higher stock consistency, then to dilute the stock to about 10% consistency, and finally to boil the mass under atmospheric pressure or higher to effect the desired purification. For instance, we may start with stock suspended in a 10% caustic soda solution at 5° C. After about fifteen minutes the stock may be thickened and washed, or washed directly until the alkalinity of the suspension corresponds to, say, 6% caustic soda, based on fiber. The mass may then be boiled under, say, 25 pounds pressure for three hours. The excess cold liquor removed from the stock prior to its dilution may be reused in the mercerization of other stock, so that power employed in refrigerating this liquor may be conserved. When the cold solutions are diluted as by washing prior to the purifying stage, soap or other reagents may be added to the diluted solutions to aid the purification of the fiber.

We claim:

1. In the processing of impure cellulose fiber of the character of pre-liberated wood pulp in a solution which mercerizes at one temperature and purifies at a higher temperature, that improvement which comprises the maintenance of the fiber in contact with the solution at the mercerizing temperature and then for a much longer period of time at the higher temperature.

2. In the processing of impure cellulose fiber of the character of the pre-liberated wood pulp with a solution capable of mercerizing only at considerably below room temperature, that improvement which comprises the maintenance of the fiber in contact with said solution for a period of time at a mercerizing temperature and for another period of time much longer than said first period at a temperature considerably above the mercerizing temperature.

3. A process which comprises maintaining impure cellulose fiber of the character of pre-liberated wood pulp in contact with a single solution of caustic soda of much less than about 18% strength for a period of time at temperatures sufficiently low to be mercerizing and for another period of time much longer than said first period at temperatures far above said mercerizing temperatures.

4. In the processing of impure cellulose fiber of the character of pre-liberated wood pulp with a solution which mercerizes only downwards of room temperature and which purifies upwards of room temperature, that improvement which comprises the maintenance of the fiber in contact with the same solution for a period of time downwards of room temperature and for another period of time much longer than said first period upwards of room temperature to effect both mercerization and purification of the fiber.

5. A process which comprises suspending cellulose fiber stock of the character of pre-liberated wood pulp in a solution of caustic soda of much less than about 18% strength at temperatures sufficiently low to be mercerizing, washing the stock suspension partially free of alkali, and heating the partially washed stock far above said mercerizing temperatures.

6. A process which comprises suspending cellulose fiber stock of the character of pre-liberated wood pulp in excess solution of caustic soda of much less than about 18% strength at temperatures sufficiently low to be mercerizing, removing only a portion of the cold liquor from said stock, diluting the stock, and heating the diluted stock far above said mercerizing temperatures.

7. A process which comprises subjecting kraft pulp to the action of a kraft white liquor containing caustic soda and sodium sulphide and of a concentration to be mercerizing only at considerably below room temperature while said liquor is maintained at such mercerizing temperatures for a period of time and at much higher than said mercerizing temperatures for another period of time.

8. A process which comprises suspending cellulose fiber stock of the character of pre-liberated wood pulp in excess caustic soda solution of much less than about 18% strength but sufficiently refrigerated to be mercerizing, heating the mercerized stock above the mercerizing temperature, and removing only a portion of said refrigerated liquor from the stock after it has been mercerized but before it has been heated, whereby said removed, refrigerated liquor portion may be reused for the initial mercerizing treatment of other cellulose fiber stock.

9. A process which comprises suspending cellulose fiber stock of the character of pre-liberated wood pulp in excess solution of caustic soda of much less than about 18% strength at temperatures sufficiently low to be mercerizing, removing only a portion of the cold liquor from said stock, and heating the stock far above said mercerizing temperatures.

10. A process which comprises suspending cellulose fiber stock of the character of pre-liberated wood pulp in excess solution of caustic soda of much less than about 18% strength at temperatures sufficiently low to be mercerizing, removing only a portion of the cold liquor from said stock, and heating the stock to at least room temperature, said solution being of a causticity such that mercerization of the stock will occur at sufficiently low temperature and purification of the stock will occur at room or higher temperature.

11. A process which comprises suspending cellulose fiber stock of the character of pre-liberated wood pulp in excess solution of caustic soda of much less than about 18% strength at temperatures sufficiently low to be mercerizing, removing only a portion of the cold liquor from the stock, diluting the stock with water, and heating the diluted stock to at least room temperature, said solution being of a causticity such that mercerization will occur at sufficiently low temperature and said step of diluting the stock with water being controlled to ensure purification of the stock at room or higher temperature.

12. A process which comprises producing a suspension of about 10% stock consistency from cellulose fiber stock of the character of pre-liberated wood pulp and caustic soda solution of much less than about 18% strength, maintaining the suspension at temperatures sufficiently low to be mercerizing, removing cold liquor from the suspension to raise its stock consistency, and heating the suspension far above said mercerizing temperatures.

13. A process which comprises producing a suspension of about 10% stock consistency from cellulose fiber stock of the character of pre-liberated wood pulp and caustic soda solution of much less than about 18% strength, maintaining the suspension at temperatures sufficiently low to be mercerizing, removing cold liquor from the suspension to raise its stock consistency, diluting the thickened suspension with water, and heating the diluted suspension far above said mercerizing temperatures.

14. A process which comprises producing a suspension of about 10% stock consistency from cellulose fiber stock of the character of pre-liberated wood pulp and caustic soda solution of much less than about 18% strength, maintaining the suspension at temperatures sufficiently low to be mercerizing, removing cold liquor from the suspension to raise its stock consistency, diluting the thickened suspension with water to a stock consistency of about 10%, and heating the diluted suspension far above said mercerizing temperatures.

15. A process which comprises producing a suspension of about 10% stock consistency from cellulose fiber stock of the character of pre-liberated wood pulp and caustic soda solution of much less than about 18% strength, maintaining the suspension at temperatures sufficiently low to be mercerizing, removing most but not all of the cold liquor from the stock, diluting the stock with water, and heating the stock in the resulting diluted caustic soda solution to at least room temperature, said solution being of a causticity such that mercerization will occur at sufficiently low temperature and said step of diluting the stock with water being controlled to ensure purification of the stock at room or higher temperature.

16. A process which comprises producing a suspension of about 10% stock consistency from cellulose fiber stock of the character of pre-liberated wood pulp and caustic soda solution of much less than about 18% strength, maintaining the suspension at temperatures sufficiently low to be mercerizing, removing most but not all of the cold liquor from the stock, diluting the stock with water, and heating for a few hours the stock in the resulting diluted caustic soda solution to at least room temperature, said solution being of a causticity such that mercerization will occur at sufficiently low temperature and said step of diluting the stock with water being controlled to ensure purification of the stock at room or higher temperature.

17. A process which comprises suspending cellulose fiber stock of the character of pre-liberated wood pulp in a liquor of about 10% causticity at a temperature below about 6° C., and then heating the stock while suspended in only a portion of said liquor to at least about 20° C. for a period of time much greater than fifteen minutes.

18. A process which comprises suspending cellulose fiber stock of the character of pre-liberated wood pulp in a liquor of about 6% to about 10% causticity at a temperature below about 6° C., and then heating the stock while suspended in only a portion of said liquor to at least about 20° C. for a period of time much greater than fifteen minutes.

MILTON O. SCHUR.
BENJAMIN G. HOOS.